Dec. 24, 1968     N. E. SINDLINGER     3,417,984

BEARING

Filed Nov. 1, 1966     3 Sheets-Sheet 1

INVENTOR
NORMAN E. SINDLINGER
BY Busser Smith & Hardy

ATTORNEYS

INVENTOR
NORMAN E. SINDLINGER

ATTORNEYS

Dec. 24, 1968     N. E. SINDLINGER     3,417,984

BEARING

Filed Nov. 1, 1966     3 Sheets—Sheet 3

INVENTOR

NORMAN E. SINDLINGER

BY *Busser Smith & Harding*

ATTORNEYS

United States Patent Office 3,417,984
Patented Dec. 24, 1968

3,417,984
BEARING
Norman E. Sindlinger, Medford Lakes, N.J., assignor to Ametek, Inc., New York, N.Y., a corporation of Delaware
Filed Nov. 1, 1966, Ser. No. 591,191
12 Claims. (Cl. 267—1)

ABSTRACT OF THE DISCLOSURE

A load member is solely supported by one or more strips of resilient material each bent into a loop with an arcuate portion joining a pair of opposite reaches. One reach of each strip is secured to the load member at a point remote from the arcuate portion and the other reach is secured to a support at a point remote from the arcuate portion. Each strip, when free, is substantially straight.

---

This invention relates to a bearing and, more particularly, relates to a bearing which is in the form of a rolling flexure.

The bearing of the invention has a wide number of uses particularly where it is desired that the bearing have a minimum resistance to the movement of a supported mass. Exemplary are accelerometer suspensions, seismograph suspensions and low-force slide assemblies.

The bearing of this invention is highly advantageous in that it is readily maintained being a compact and rugged structure and is relatively inexpensive.

The bearing of the invention comprises a strip of resilient material such as, for example, spring steel or a resilient synthetic resin which is formed into a loop with a reach extending from the arcuate portion of the loop along and secured to a load member and having a second reach extending from the arcuate portion of the loop along and secured to a support member. A major portion of each reach will be in contact with its respective member. The arrangement may be such as to provide linear or angular displacement of the load member. The flexure strip supports the mass and permits displacement of the mass by allowing the flexure strip to roll off the load member and onto the support member and vice versa on displacement and to act oppositely on return to the original position. This action can be carried out with a minimum of friction and while resiliently supporting the load.

While a low gradient is desirable for the bearing of the invention in many instances, there are occasions when a fixed, programmed or adjustable gradient is desirable. It also may be desirable to have the bearing system biased towards its center position or to either side of its center position. These results can readily be achieved with this invention.

It will be appreciated that not only is a frictionless bearing provided, but also the load is resiliently supported.

Figure 1:
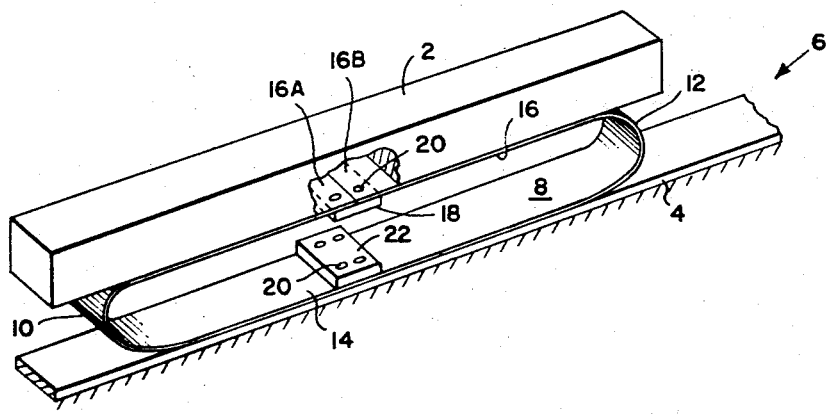
Figure 2:
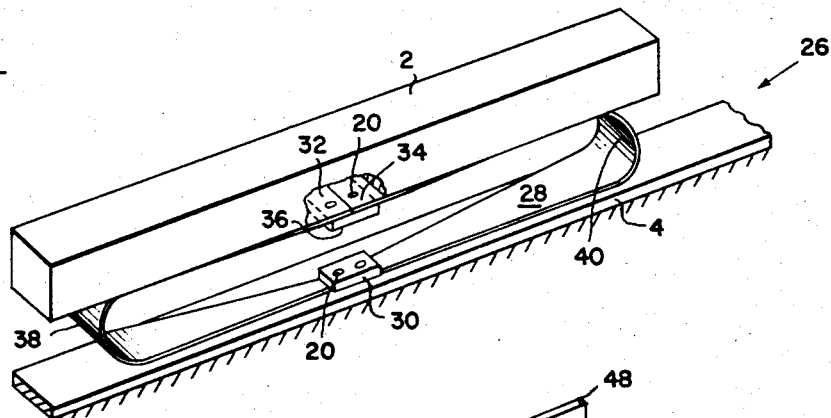
Figures 3, 3B:
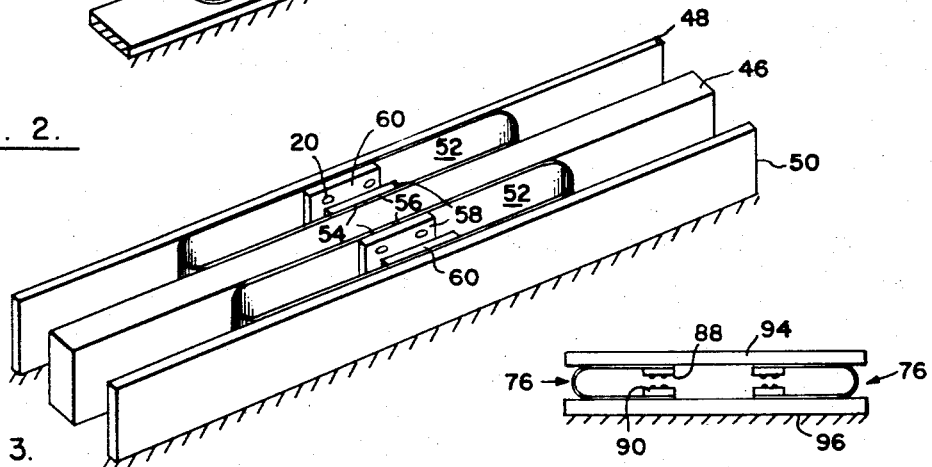
Figure 3A:
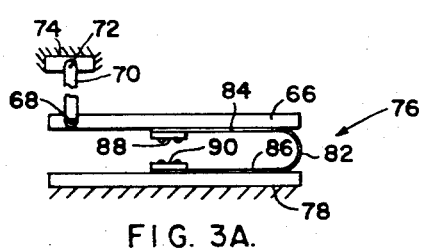
Figure 4:
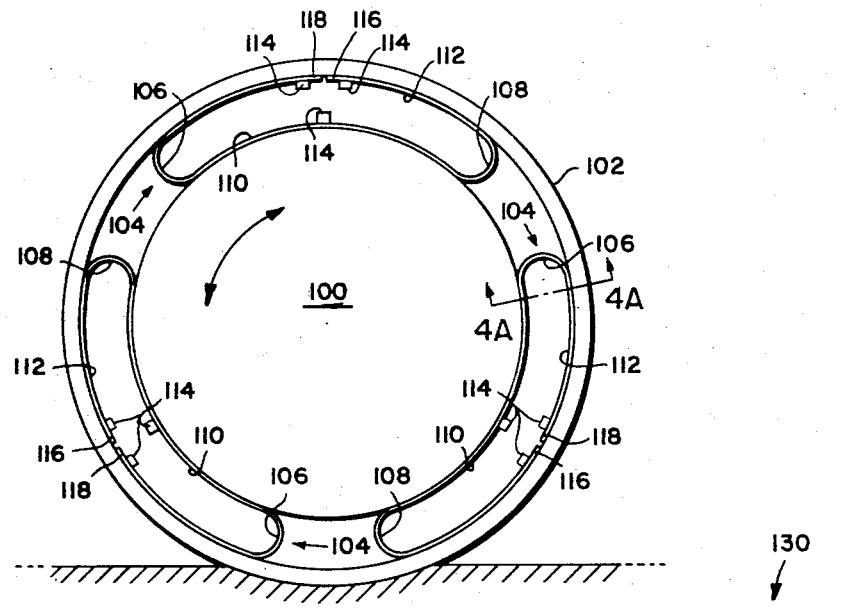
Figure 4A:
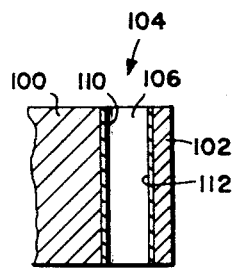
Figure 5:
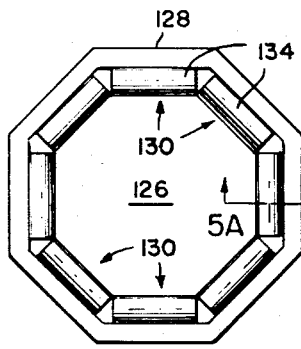
Figure 5A:
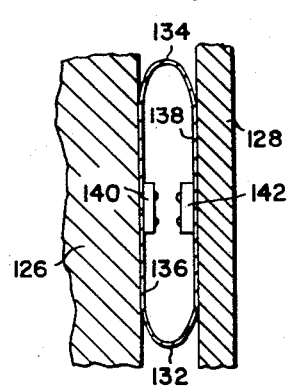
Figure 7:
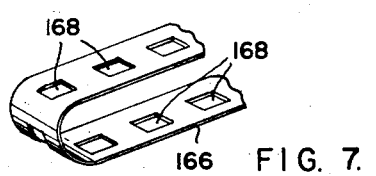
Figure 6:
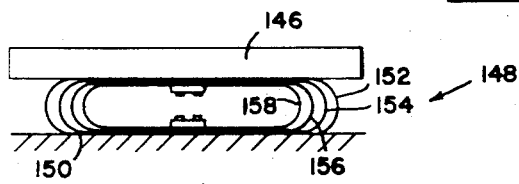
Figure 8:
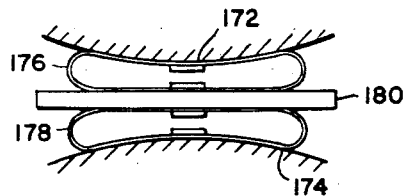
Figure 9:
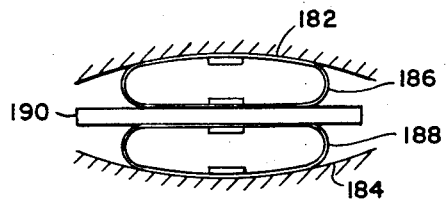
Figure 10:
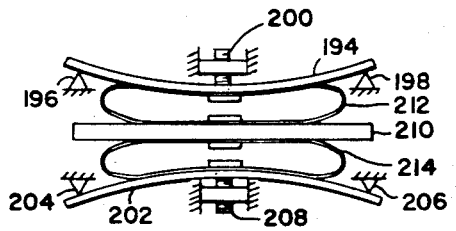
Figure 11:
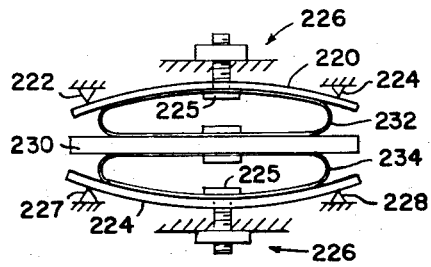
Figure 12:
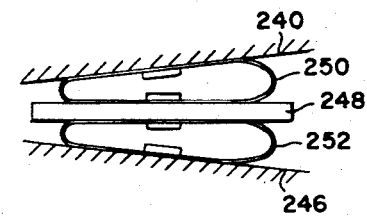
Figure 13:
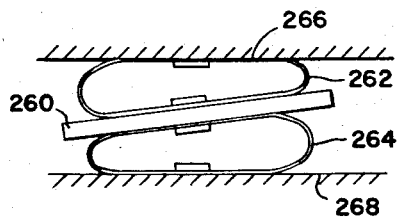
Figure 14:
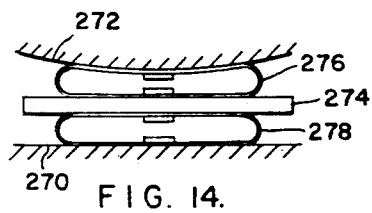
Figure 15:
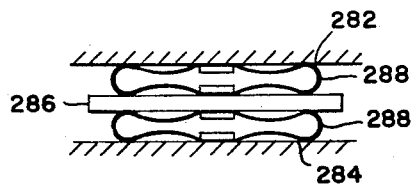

The invention will be further clarified on reading the following description in conjunction with the drawings in which:

FIGURE 1 is a front perspective view of an embodiment of the invention;
FIGURE 2 is a front perspective view of an alternative embodiment of the invention;
FIGURE 3 is a front perspective view of an alternative embodiment of the invention;
FIGURE 3A is a front elevation of an alternative embodiment of the invention;
FIGURE 3B is a front elevation of an alternative embodiment of the invention;
FIGURE 4 is a front elevation of an alternative embodiment of the invention;
FIGURE 4A is a section taken on the plane indicated by the line 4A—4A in FIGURE 4;
FIGURE 5 is a front elevation of an alternative embodiment of the invention;
FIGURE 5A is a section taken on the plane indicated by the line 5A—5A in FIGURE 5;
FIGURE 6 is a schematic showing of an alternative embodiment of the invention;
FIGURE 7 is a perspective view, partially broken away, of a flexure element which can be employed with the invention;
FIGURE 8 is a schematic showing of an alternative embodiment of the invention;
FIGURE 9 is a schematic showing of an alternative embodiment of the invention;
FIGURE 10 is a schematic showing of an alternative embodiment of the invention;
FIGURE 11 is a schematic showing of an alternative embodiment of the invention;
FIGURE 12 is a schematic showing of an alternative embodiment of the invention;
FIGURE 13 is a schematic showing of an alternative embodiment of the invention;
FIGURE 14 is a schematic showing of an alternative embodiment of the invention; and
FIGURE 15 is a schematic showing of an alternative embodiment of the invention.

Referring first to FIGURE 1, a load bar 2 is mounted for lengthwise movement on a support member 4 by means of a bearing 6 in accordance with the invention. Bearing 6 is formed from a strip 8 of spring steel. Strip 8 is formed into a closed loop having arcuate portions 10 and 12 at either end joined by a lower reach 14 and an upper reach 16 which for the majority of their extent lie flat against support member 4 and load bar 6 respectively. The end portions 16A and 16B of strip 8 are abutted and secured to the center of bar 2 by means of a clamping plate 18 and machine screws 20. The central portion of reach 14 is secured to support member 4 by means of a clamping plate 22 and machine screws 20.

The strip 8 is selected with respect to load bar 2 so that the maximum stress at the minimum radius of curvature of arcuate portions 10 and 12 which are substantially elliptical, which is the point of maximum stress, will not exceed the yield point. That is to say if strip 8 were removed it would return to its original flat condition.

Assuming the stresses in the arcuate portions 10 and 12 to be within the elastic range of strip 8 and assuming the support 4 and bar 2 are substantially level, the strip 8 is in pure rolling contact with bar 2 and support member 4 with virtually zero frictional resistance. Hence, the energy required to deform the material entering the region of minimum curvature of each arcuate portion 12 is exactly balanced by the energy delivered by the material leaving the said region of minimum curvature. Thus, except for extremely small hysteresis losses in the material of which strip 8 is formed, the resistance to linear motion of bar 2 is close to zero for small movement of bar 2 to the left or right as viewed in FIGURE 1. Even with large movements of bar 2 the resistance to movement is small. However, as the center of gravity of bar 2 shifts, for example, on movement to the right as viewed in FIGURE 1, the arcuate portion 12 will decrease in radius while arcuate portion 10 will increase in radius. This introduces a gradient unbalancing the system and requiring work to be done to restore the system to the balanced condition.

As illustrated in FIGURE 2, the foregoing system unbalancing can readily be compensated for. Here the load bar 2 is mounted on support member 4 by means of a bearing 26 comprising a tapered strip 28 of spring steel secured to the center of support member 4 by a clamping plate 30 and machine screws 20 and tapering outwardly from the secured center portion to the end portions 32 and 34 which abut at the center of bar 22 and are secured by clamping plate 36 and machine screws 20. In this embodiment, as the center of gravity of bar 2 shifts, for example, to the right away from arcuate portion 38 and towards arcuate portion 40 of strip 28, thus tending to increase the radius of arcuate portion 38 and decrease the radius of arcuate portion 40, the force being exerted by the arcuate portion 40 is increasing due to the increasing width of strip 28 in the arcuate portion 40 while the force exerted by the arcuate portion 38 is decreasing due to the decreasing width of strip 28 in the arcuate portion 38. In this manner an energy balance is achieved to accommodate the shifting center of gravity thus eliminating the introduction of a gradient change.

In FIGURE 3 a load bar 46 is suspended between a pair of spaced support members 48 and 50. A strip 52 of spring steel is formed into a loop in the manner of strip 8 with the end portions 54 and 56 secured to the middle of bar 46 by a clamping plate 58. The strip 52 is also secured to support member 50 by clamping plate 60. Similarly a strip 52 formed into a loop is secured to support member 48 and bar 46. The rolling action of the strip 52 is the same as that of strip 8, the only essential difference between the embodiment of FIGURE 1 and the embodiment of FIGURE 3 being that the load bar is supported with the force exerted by the load parallel to the reaches of the strips rather than perpendicular as in the embodiment of FIGURE 1.

A simplified bearing in accordance with the invention is shown in FIGURE 3A. A load bar 66 is pivotally connected at 68 to a lever 70 which is pivotally connected at 72 to a support member 74. A bearing member 76 in accordance with the invention is interposed between load bar 66 and support member 78. Bearing member 76 comprises a strip of a resilient material such as spring steel formed into a loop with an arcuate portion 82, an upper reach 84 and a lower reach 86. The upper reach is secured to load bar 66 by a clamping plate indicated at 88 and the lower reach is secured to support member 78 by a clamping plate indicated at 90. Here again as load member 66 moves either to the right or to the left, bearing member 76 is in rolling contact with load bar 66 and support member 78 with the spring action of the bearing supporting load member 66 along with lever 70.

Referring now to FIGURE 3B there is illustrated a load member 94 supported by a pair of bearing 76 which are identical with the bearing 76 disclosed in FIGURE 3A and which are secured to a support member 96. FIGURE 3B illustrates that a plurality of open loop bearing members in accordance with the invention may be employed.

Referring now to FIGURE 4 a disc 100 is mounted for oscillatory rotary movement in a ring 102 by means of a plurality of bearing members 104 in accordance with the invention. Each bearing member 104 comprises a closed loop formed from a strip of resilient material such as spring steel and having at either end an arcuate portion 106 and 108 connected by a reach 110 and a portion 112. Each reach 110 is secured to disc 100 by a threaded clamp indicated at 114. Reach 112 is secured to ring 102 by virtue of securing the strip ends 116 and 118 to ring 102 by clamp 114. Disc 100 may be displaced for a substantial angle either clockwise or counterclockwise with very little torque with the bearing members 104 acting in the same manner as previously described with respect to linear displacement.

Referring now to FIGURE 5, a polygonal shaft 126 is mounted for axial movement within a polygonal sleeve 128 by means of a plurality of bearing members 130.

As best seen in FIGURE 5A, each bearing member 130 comprises a strip of resilient material formed into a closed loop and having arcuate portions 132 and 134, a reach 136 and a reach 138 with the reach 136 secured to sleeve 126 by a clamping plate 140 and reach 138 secured to sleeve 128 by a clamping plate 142.

In FIGURE 6 there is illustrated the employment of a plurality of flexure strips. As shown, a load bar 146 is supported on a bearing member 148 which in turn is supported by a supporting structure indicated at 150. Bearing member 148 differs from bearing member 6 of FIGURE 1 only in that it employs a plurality of resilient strips indicated at 152, 154, 156 and 158. These strips are formed so that their arcuate end portions will be out of contact so as to avoid the imposition of friction between strips. The employment of a plurality of flexure strips increases the load capacity of the bearing and is a more compact structure than that which could be obtained with a single flexure strip of increased thickness which would involve an increase in the radius of the end portions when operating at maximum stress for the selected material.

In FIGURE 7 there is illustrated a flexure strip 166 in accordance with the invention having blanked out portions 168. The blanked out areas provide for a multiplicity of stable positions of the system when they are employed. When the blanked out areas are centered at the normally minimum radius portion of the end arcuate portions of the bearing, the system stabilizes without any tendency to move in either direction.

Referring now to FIGURE 8, a system is schematically represented in which stationary frames 172 and 174 along which the bearings 176 and 178 roll are arcuate. Bearings 176 and 178 support a load bar 180. The system will reach equilibrium when carefully centered but will have a gradient which will tend to bias the system toward either end when displaced from the center position.

Referring to FIGURE 9, a system is schematically represented in which the stationary frames 182 and 184 along which bearings 186 and 188 roll are arcuate in the reverse direction from the arc of frames 172 and 174 of FIGURE 8. Bearings 186 and 188 support a load bar 190. Here the system will not exhibit any balanced point but will always be biased to a center position when displaced to either end.

FIGURES 10 and 11 schematically illustrate that the supporting frames can be mounted so that their curvature can be varied. In FIGURE 10, frame 194 is end mounted as indicated at 196 and 198 and urged downwardly a variable amount by the centrally mounted screw 200. Similarly frame 202 is end mounted as indicated at 204 and 206 and is urged upwardly by screw member 208. A load bar 210 is carried between bearing members 212 and 214 in accordance with the invention.

In FIGURE 11, there is shown schematically a frame 220 end mounted as indicated at 222 and 224 and urged upwardly by screw member 226 which passes through frame 220 and is attached to a plate 222. Similarly frame member 224 is end mounted as indicated at 227 and 228 and is urged outwardly by a threaded member 226 similarly connected to a plate 222. A load bar 230 is supported by bearing members 232 and 234 in accordance with the invention.

Referring to FIGURE 12, the pair of frames 240 and 246 are disposed at an angle with respect to each other and have a load bar member 248 mounted therebetween by means of bearing members 250 and 252 of the invention. In this system the biasing force will tend to force the bar 248 in a direction toward the larger bearing loops.

Referring now to FIGURE 13, a bar 260 is to be moved so as to travel at an acute angle to the horizontal between bearing members 262 and 264 which are in turn secured to frame members 266 and 268. Since the frame members 266 and 268 are parallel this system does not have a gradient.

FIGURE 14 illustrates the employment of the invention using opposed surfaces 270 and 272, the former being flat and the latter being arcuate. Here again a load bar 274 is supported by bearing members 276 and 278 in accordance with the invention.

Referring now to FIGURE 15, a frame indicated at 282 and a parallel frame indicated at 284 have between them a load bar 286 which is respectively connected to the frame members by bearings 288, 288 of the invention. The bearing members 288 have been stressed beyond their elastic limit in order to set them. In the case illustrated, the setting was accomplished by moving together the frame members 282 and 284. The frame members were then separated a distance such that the elastic limit of bearings 288, 288 would not be exceeded. If the bar 286 is displaced axially it will be biased to three discrete positions, i.e., the center or either end.

It will be understood that the foregoing is by way of illustration and is not intended to be limiting.

What is claimed is:

1. In a combination:
    a load member,
    a support member,
    said members having opposed surfaces,
    a strip of spring material selected from the group consisting of metal and synthetic resin spring material bent without permanently setting the material into a loop with an arcuate portion joining a pair of opposite reaches one of which has a major portion in rolling contact with one member and the other of which has a major portion in rolling contact with the opposite member,
    means to secure each reach to its adjacent member at points remote from the arcuate portion, said load member being supported on the support member solely by said strip, and said strip, when free, being substantially flat.

2. The combination of claim 1 in which the opposed surfaces are substantially parallel.

3. The combination of claim 1 in which the opposed surfaces are arcuate.

4. The combination of claim 1 in which the opposed surfaces are oppositely convex.

5. The combination of claim 1, in which the opposed surfaces are oppositely concave.

6. The combination of claim 1 having at least one additional strip similarly formed and secured with its arcuate portion spaced from the first mentioned arcuate portion, said load bearing member being supported on the support member solely by said strips and said strips, when free, being substantially flat.

7. The combination of claim 1 in which the load exerts its major force component perpendicular to the reaches.

8. The combination of claim 1 in which the load exerts its major force component parallel to the reaches.

9. The combination of claim 1 in which the reaches are substantially horizontal and the load is on top of the reach to which it is connected, the strip tapering inwardly from the upper reach to the lower reach.

10. The combination of claim 1 in which a second similar strip is adjacent the first strip and secured to a supporting surface, all the reaches being substantially vertical, the adjacent reaches being secured to opposite sides of the load member, and the load bearing member being supported solely by said strips and said strips, when free, being substantially flat.

11. In combination:
    a load member,
    a support member,
    said members having opposed surfaces of substantial extent,
    a strip of spring material selected from the group consisting of metal and synthetic resin spring material bent without permanently setting the material into a loop having two reaches one of which has a major portion in rolling contact with one member and the other of which has a major portion in rolling contact with the other member,
    means to secure both ends of the strip to one of the members,
    means to secure the center of the strip to the other member, said load member being supported on the support member solely by said strip, and said strip, when free, being substantially flat.

12. The combination of claim 11 in which the loop is formed into two reaches one of which has a major portion in contact with one member and the other of which has a major portion in contact with the other member and the ends of the strip are secured adjacent the center of said one strip.

References Cited

UNITED STATES PATENTS

| | | | |
|---|---|---|---|
| 481,460 | 8/1892 | Ashley | 152—73 |
| 1,120,156 | 12/1914 | Palmer | 152—73 |
| 1,199,154 | 9/1916 | Buck | 152—73 |
| 3,140,113 | 7/1964 | Williams | 267—1 |
| 3,259,142 | 7/1966 | Richards | 267—1 |

ARTHUR L. LA POINT, *Primary Examiner.*